April 12, 1932.  R. C. McCLAY  1,853,445
METHOD FOR COLORING MOTION PICTURE FILMS
Filed April 24, 1929  7 Sheets-Sheet 1

INVENTOR.
Roy C. McClay
BY Arthur L. Mack
ATTORNEYS.

April 12, 1932. R. C. McCLAY 1,853,445
METHOD FOR COLORING MOTION PICTURE FILMS
Filed April 24, 1929 7 Sheets-Sheet 4

INVENTOR:
Roy. C. McClay
BY
ATTORNEYS.

April 12, 1932.   R. C. McCLAY   1,853,445
METHOD FOR COLORING MOTION PICTURE FILMS
Filed April 24, 1929   7 Sheets-Sheet 7

INVENTOR.
Roy C. McClay
BY Arthur L. Mack
ATTORNEYS

Patented Apr. 12, 1932

1,853,445

UNITED STATES PATENT OFFICE

ROY C. McCLAY, OF LOS ANGELES, CALIFORNIA, ASSIGNOR TO FIRST NATIONAL PRODUCTIONS CORPORATION, OF BURBANK, CALIFORNIA, A CORPORATION OF DELAWARE

METHOD FOR COLORING MOTION PICTURE FILMS

Application filed April 24, 1929. Serial No. 357,807.

This invention relates to the coloring of motion picture films by what is generally known in the art as imbibition and osmosis, and the main object is to provide an improved method in which a transfer of a coloring agent or dye from a key film operating as a matrix or stencil is effected by moving the key film and a subjective film in close contact and in accurate registration for a short interval or intervals of time.

In the consideration of this invention it may be understood that others have sought to accomplish the above objects by means of other devices and the practice of other methods, but the same have not been successful or effective to an extent which adapted such means and methods to use in motion picture production laboratories.

The main difficulty encountered heretofore has been in the provision of accurate means for moving key film and the subjective film in air tight contact, and in accurate registration for a sufficient interval of time to effect a complete or sufficient transfer of color from the key film to the subjective film.

It is an object of this invention, therefore, to provide an improved method and means for accomplishing this specific result in connection with other well known features which I have illustrated in the drawings accompanying the disclosure of the improvements.

It will be understood that in the coloring of motion picture films a positive key film is so treated in the laboratories that the exposed portions of the films, ordinarily termed "frames" are in whole or in part rendered susceptible to dyes of certain well known characteristics, whereby such portions of the key film may carry a quantity of dye by saturation in the gelatinous coating of the film. The film is rendered susceptible to the dyes by softening the gelatinous coating of the film in desired areas of each of the frames.

The characteristics of the key films carrying such dyes are therefore such that when the dyed portions of the film are moistened, the dye contained thereon may be imparted to another surface by contact and pressure. This is generally termed "imbibition".

It has been found necessary in order that the transfer of the dye may be uniformly effective in its application to a subjective film, that the contact between the two films must be maintained by pressure for a substantial distance or distances, while the films are accurately registered.

Accordingly, it is an object of this invention to provide an improved type of color transferring device by means of which the key film and the subjective films are moved in close contact with each other, and in accurate registration for suitable instances, together with means for moistening the subjective film, for feeding the two films to the color transfer means, and for feeding and storing the two films subsequent to the color transferring operation.

Other objects will appear as the description progresses.

In the accompanying drawings I have shown a preferred form of a mechanism for the purpose described, in which.

The machine is generally arranged with a frame A of substantial proportions, having two different series of rollers mounted thereon at the top and bottom for movably supporting and storing two separate films F and F'. Said means includes upper and lower sets of rollers A1 and A2 associated with the film F', and corresponding sets of rollers A3 and A4 associated with the film F.

Rollers A1 and A2 are mounted on shafts A5 and A6 respectively, which are supported on suitable cross members of the frame A and at the top and bottom thereof, and the rollers A3 and A4 are similarly mounted on shafts A7 and A8 supported on said members.

The films F and F' are, respectively, mounted on reels F1 and F2 which are detachably held on suitable portions of the frame A by means of members F3 and F4, respectively. F represents the color or key film from which color is adapted to be applied at selected areas in each of the frames to the subjective film F'.

Frame A has a forwardly projecting bed plate A9 on which is mounted a pair of longitudinally spaced film feeding units B and C, including brackets B' and C', respectively, attached to the member A9. Bracket B' adjustably supports a pair of film feeding sprockets F6 and F7 mounted one above the other and spaced apart for engagement with the films F and F', respectively. The film F is fed direct from the reel F1 to the sprocket F6, while the film F' from reel F2 over a pair of rollers F8, F9 which are spaced apart and are supported on a bracket F10 which is submerged in a volume of water or other suitable liquid contained in a tank F11, mounted below the reel F2.

Thus the film F' as it is fed from the reel F2 moves through the water or liquid in the tank F11 so as to moisten the dye receiving surface thereon.

Figure 1:
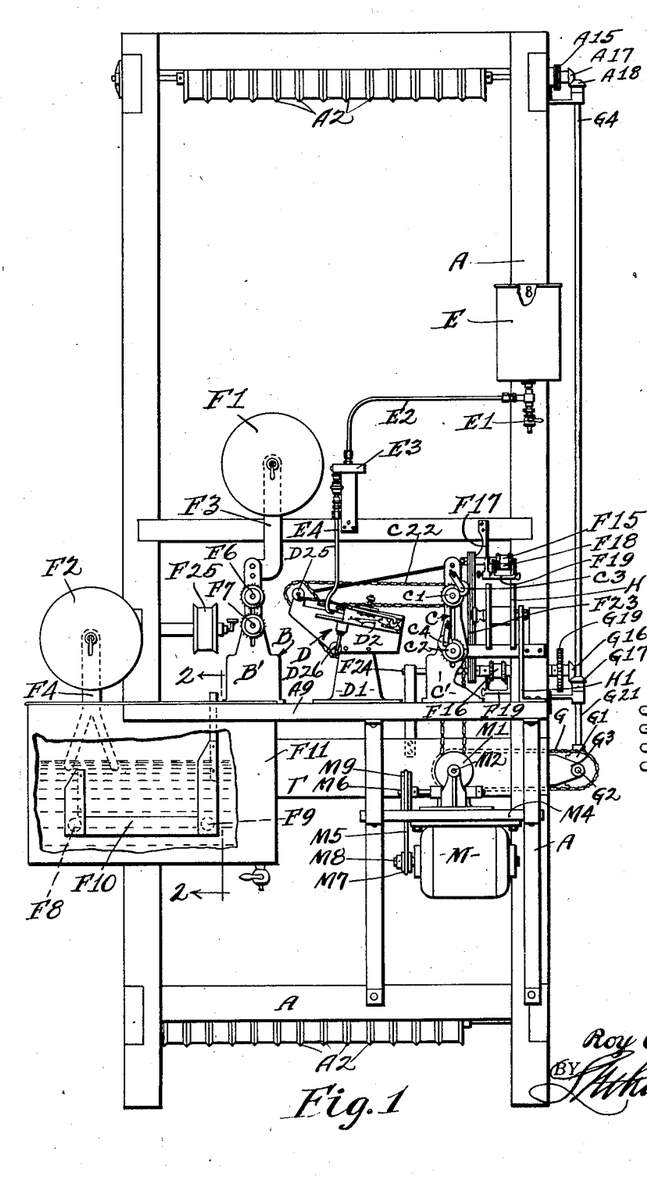
Fig. 1 is a front elevation.
Figure 2:
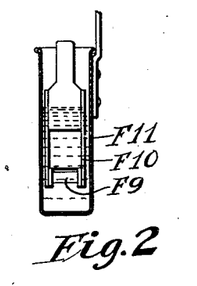
Fig. 2 is a section on line 2—2 of Fig. 1.
Figures 23, 24:
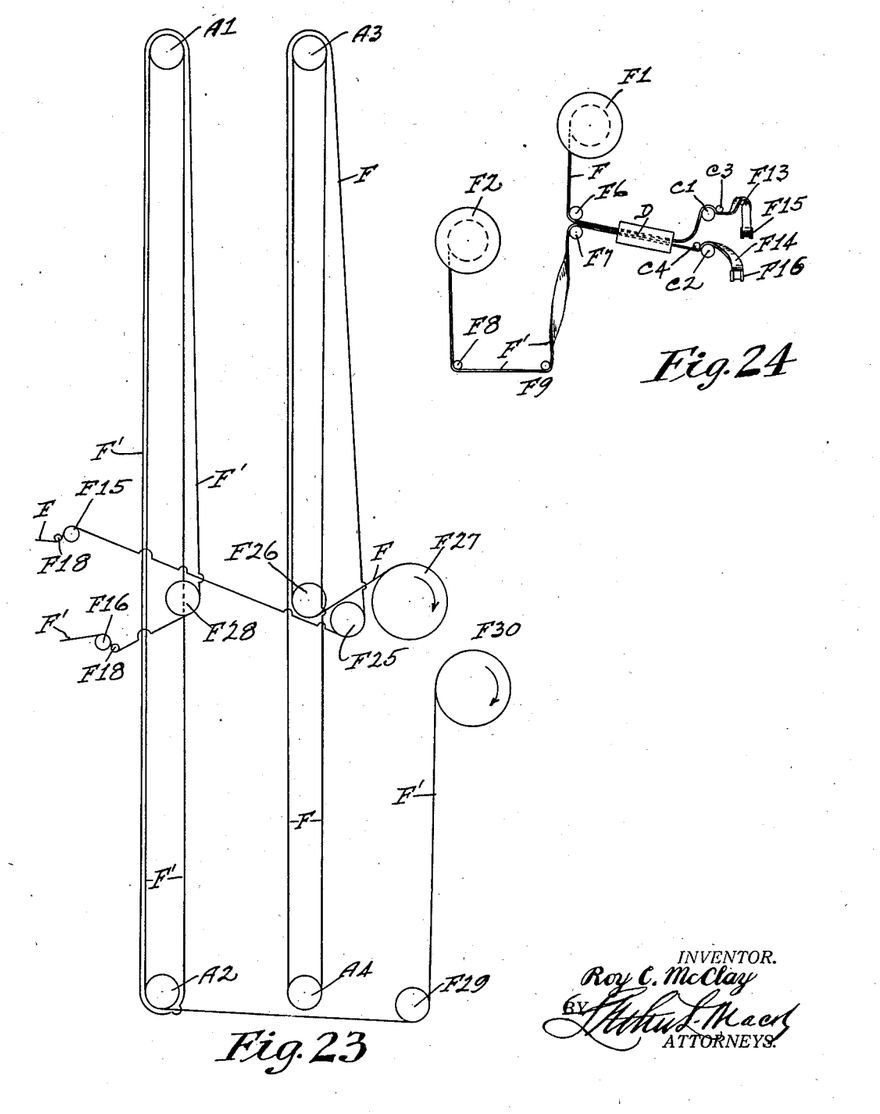
Fig. 23 is a diagrammatic view in elevation of the film threaded through the machine as in a coloring operation.
Fig. 24 is a diagrammatic front view of the film as it is fed to and from the film coloring means.

As shown in Fig. 24 it will be observed that the film F' is twisted between the roller F9 and the sprocket F7 so that the outer surface of the film will be uppermost and in contact with the film F as the films are fed from rollers F6 and F7 to the right, as shown in Fig. 1.

The film coloring mechanism proper is shown at D intermediate the units B and C, and embodies a suitable standard D1 mounted on the frame member A9 having spaced side members D2 and D3 attached to or integrally formed with the standard D1 for operably supporting the film coloring mechanism.

Intermediate the side members D2 and D3 a plurality of rollers D4, D4, etc., are rotatably but rigidly mounted between the side members D2 and D3, and have trunnions D5, D5, etc., projecting through perforations D6, D6 in the side members. Said trunnions are journaled in the depending legs of an inverted U-shaped member D7 which extends transversely across the upper edges of members D2 and D3.

A fixed plate D8 connects members D2 and D3 above rollers D4 and carries a stud D9 which extends through the members D7 and has an adjusting nut D10 on the upper end thereof. A spring D11 is carried on the stud D9 and is compressed between the nut D10 and the member D7 for tensioning the rollers D4 against the films F and F', which move beneath and in contact with the rollers as shown in Fig. 16.

Figures 16, 17, 18, 19, 20:
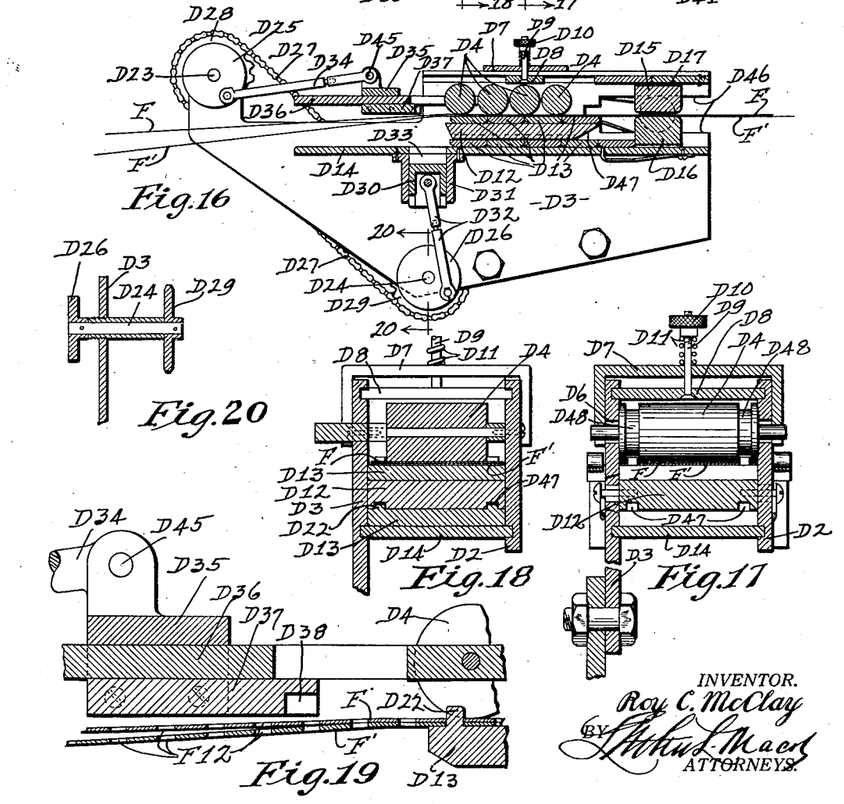
Fig. 16 is a section of the same on line 16—16 of Fig. 15.
Figs. 17 and 18 are transverse sections of the same on line 17—17 and 18—18 of Fig. 15.
Fig. 19 is a longitudinal section of the film coloring means on line 19—19 of Fig. 15.
Fig. 20 is a section of the film coloring means on line 20—20 of Fig. 16.

Below the rollers and spaced therefrom is a horizontal plate D12 which forms a guideway on its upper and lower surfaces for a plurality of contact blocks D13, D13, etc., which as they move to the right as seen in Fig. 16 over the upper surface of the plate D12 hold the films F and F' firmly in contact with each other against the tension of spring D11 and the rollers D4.

It will be observed that in the form of device shown the plate D12 is of sufficient length that it will movably support four of the blocks D13 on its upper surface; that is, one contact block for each of the rollers D4. Altogether there are nine of the blocks D13, five of which are always in the plane of the lower side of the plate D12, and four of which are in the plane of the upper side of said plate.

A base plate D14 is provided below and spaced from the plate D12. The space between said plates corresponds to the thickness of the contact blocks D13, so that said blocks may move to the left, as seen in Fig. 16, and freely between the plates D12 and D14.

The plate D14 extends substantially to the left and right of the ends of the plate D12 and a pair of transverse blocks D15 and D16 are provided forwardly of plate D12 and are slidable respectively, on the side members D2 and D3, as hereinafter described.

Said blocks are spaced apart slightly so as to permit the free movement of the films F and F' therebetween. A top plate or plates D17 may be provided above the block D15 and connecting the side members D2 and D3.

The block D16 is movable relative to the plate D12 to correspond to the width of one of the blocks D13, so that as the blocks D13 in succession are moved from the right hand end of plate D12, they may be guided downwardly at an angle and limited in their forward movement by engagement with the block D16, as each of the blocks in succession will assume the position represented by the formost block D13 adjacent the block D16 in Fig. 16.

Figure 14:
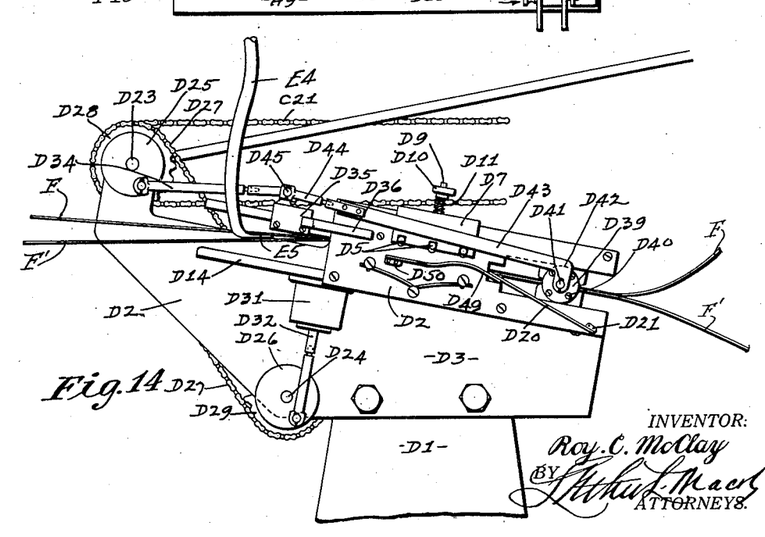
Fig. 14 is an enlarged front elevation of the film coloring mechanism proper.
Figure 15:
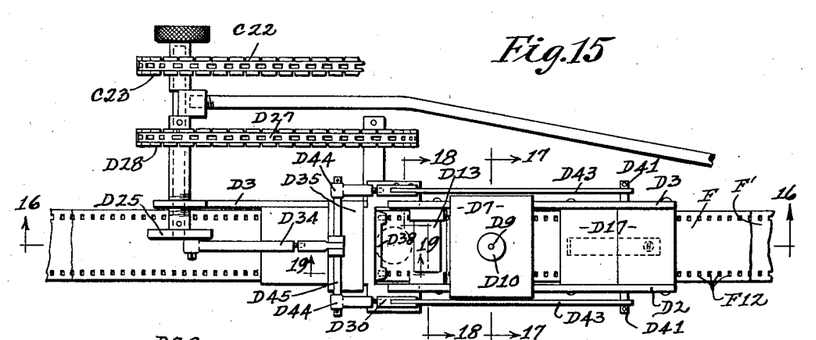
Fig. 15 is a plan of the same.

Each of the blocks D13 is provided with a diagonal slot D18 on each of its ends which is adapted to engage an inwardly turned portion D19 of a spring D20 which is fixed at its forward end D21 to the plates D2 or D3, as the case may be. The springs D20 overlie the forward ends of springs D49, which are fixed at points D50 to the plates D2 and D3, as shown in Fig. 14.

Each of the blocks D13 has a pair of transversely alined lugs D22, D22 projecting upwardly therefrom and adapted to engage the perforations F12, F12 of the films F and F', as shown in Fig. 19, for the purpose of holding said films in accurate registration during the duration of their engagement with the rollers D4 and the blocks D13.

Frame member D3 rotatably supports a pair of short transverse shafts D23 and D24, as shown in Fig. 16, and said shafts carry, respectively, on their forward portions, crank discs D25 and D26 which are synchronously operated by means of a sprocket chain D27 which operably connects sprockets D28 and D29 on the rear ends of the shafts D23 and D24, respectively.

Crank D26 is operably connected by means of a connecting rod D32 with a piston D30, which is reciprocably mounted in a vertically disposed cylinder D31 attached or formed on the plate D14 and the bore D33 of said cylinder is open at the upper surface of plate D14.

Power is applied to the shaft D23 as hereinafter described.

Crank D25 is operably connected by means of a connecting rod D34 with a cross head D35 slidable on a bar D36 rigidly attached to the member D3 and parallels the plate D14. Cross head D35 has a lower portion D37 which is provided with notches D38 in the forward corner thereof, which are spaced apart laterally of the films F and F' to correspond to the spacing of the lugs D22 on the contact blocks D13. The movement of the crank D25 effects the reciprocation of the cross head D35 relative to the rollers D4 and at each forward movement of said cross head the films F and F' and uppermost tiers of blocks D13 are moved forwardly beneath the rollers D4, for a distance to correspond to one frame and the width of one of the blocks D13.

The lowermost tier of blocks are moved to the left as seen in Fig. 16 by means of a block D16 which engages the foremost block of said tier.

The blocks D15 and D16 are provided at each end with a disc D39 attached to said blocks by means of screws D40 or otherwise, and said discs have trunnions D41 extending laterally therefrom which are held in the ends D42 of connecting rods D43. Said connecting rods have fittings D44 on the ends thereof which are swiveled on a transverse rod D45 which also serves to connect the connecting rod D34 with the cross head D35. Thus the cross head D35 and blocks D15 and D16 reciprocate together and to a uniform extent.

The discs D39 slidably engage slots D46 in the ends of members D2 and D3, as shown, for guiding the blocks D15 and D16 in their movement. The block D13 in the extreme left hand end of the lowermost tier of such blocks is moved into position immediately above the piston D30 when the blocks D15 and D16 assume their extreme left hand positions, and immediately following such movement the piston D30 is thrust upwardly and elevates the left hand block D13 to the plane of the uppermost tier of such blocks. At such times the lugs D22 on the block D13 will engage the recesses D38 in the cross head D35, and the resulting forward movement of the cross head will move the upper tier of blocks D13, namely, five in number, together with the films F and F' forwardly over the guide plate D12, until the block so elevated will have assumed a position occupied by the left hand block in the upper tier, as shown in Fig. 16.

In the meantime, the blocks D15 and D16 have moved forwardly to their extreme right hand positions, and the right hand block D13 in the upper tier has been moved downwardly into the position at the extreme right hand end of the lower tier in readiness for a succeeding operation.

The forward end of guide plate D12 is beveled at D46 so as to permit the free movement of the lower tier of blocks and especially the right hand block in such tier to operative position below the guide plate. It will be observed by reference to Figs. 17 and 18 that the guide plate D12 has longitudinal grooves D47 therein, and the rollers D4 are provided with annular grooves D48 at points to correspond to the position of and to permit the movement of the lugs D22 on blocks D13 relative to the guide plate and the rollers.

I may employ, when and if necessary, an auxiliary water supply for dripping water or liquid into position between the films F and F' in order to insure a close contact of the films and the expulsion of air from between the films during the color transfer operation.

Such means may include a water tank E having a drain cock E1 and a feed pipe E2 connected with a fitting E3. The dripping pipe E4 may be provided for connection with the fitting E3 and may have a flattened end E5 adapted to be inserted between the films F and F' as shown in Fig. 14, at a point in advance of the rollers D4.

In some cases it may be advisable to employ a plurality of the coloring units D, and to this end the fitting E3 is provided so that one of the drip pipes E4 may be connected with said fitting for each coloring unit.

As the films F and F' move from the unit D they are adapted to engage sprockets C1 and C2, respectively, which are adjustably mounted on the bracket C' and have yieldable follower rollers C3 and C4 employed in connection therewith for holding the films in operative engagement with said sprockets.

Figure 21:
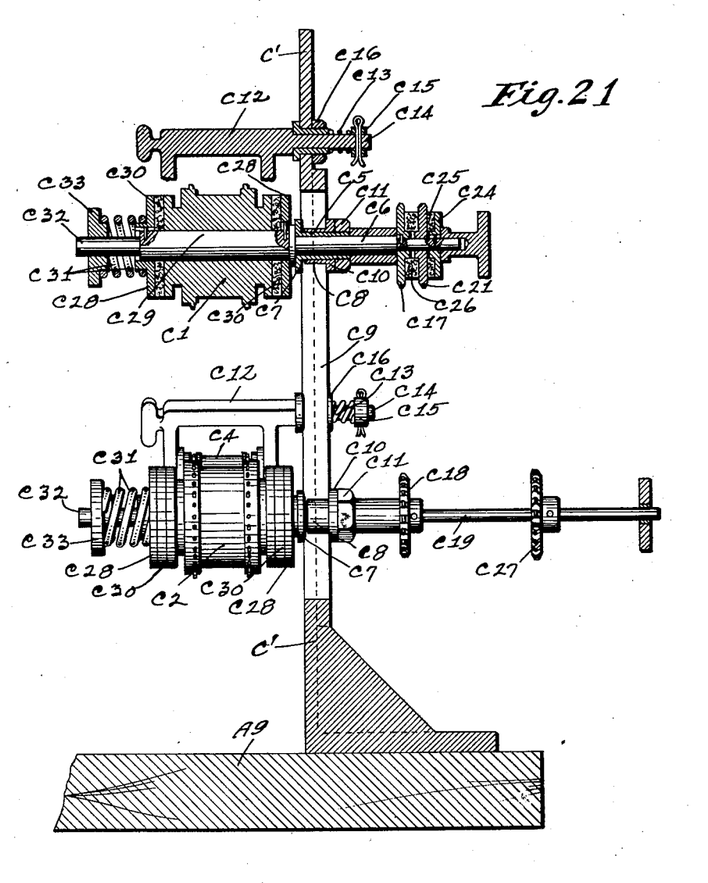
Fig. 21 is an enlarged sectional elevation on line 21—21 of Fig. 13.
Figure 22:
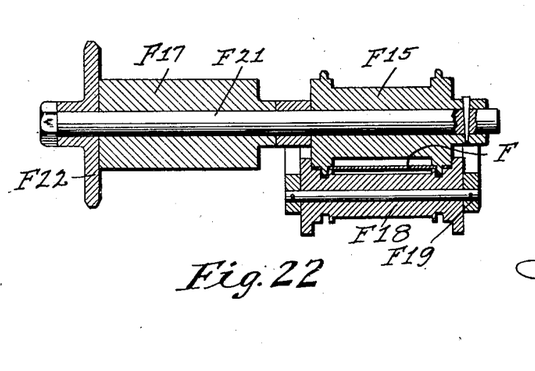
Fig. 22 is a transverse section on line 22—22 of Fig. 5.

Referring to Fig. 21 it will be noted that the sprockets C1 and C2 are adjustably mounted on the bracket C' by means of a collar as at C5 which embraces the shaft C6 of the sprocket C1. Said collar has a flange C7 which engages the forward side of the bracket C' and loosely carries a telescoping collar C8 which is vertically adjustable in a slot C9 in the member C'.

Collar C8 has a flange C10 which engages the rear side of member C' and abuts a lock nut C11 which is threaded on the rear end of the collar C5. Thus the nut serves to hold the roller C1 in adjusted position on the bracket. A similar means for holding the sprocket C2 is provided as shown in Fig. 21.

The follower rollers C3 and C4 are mounted on arms C12 which are yieldably held in alinement with associated sprockets by means of compression springs C13 carried on end stems C14 adapted to compress between set collars C15 on said stems and bearings C16 held in the brackets C'.

Figures 4, 5, 6, 7:
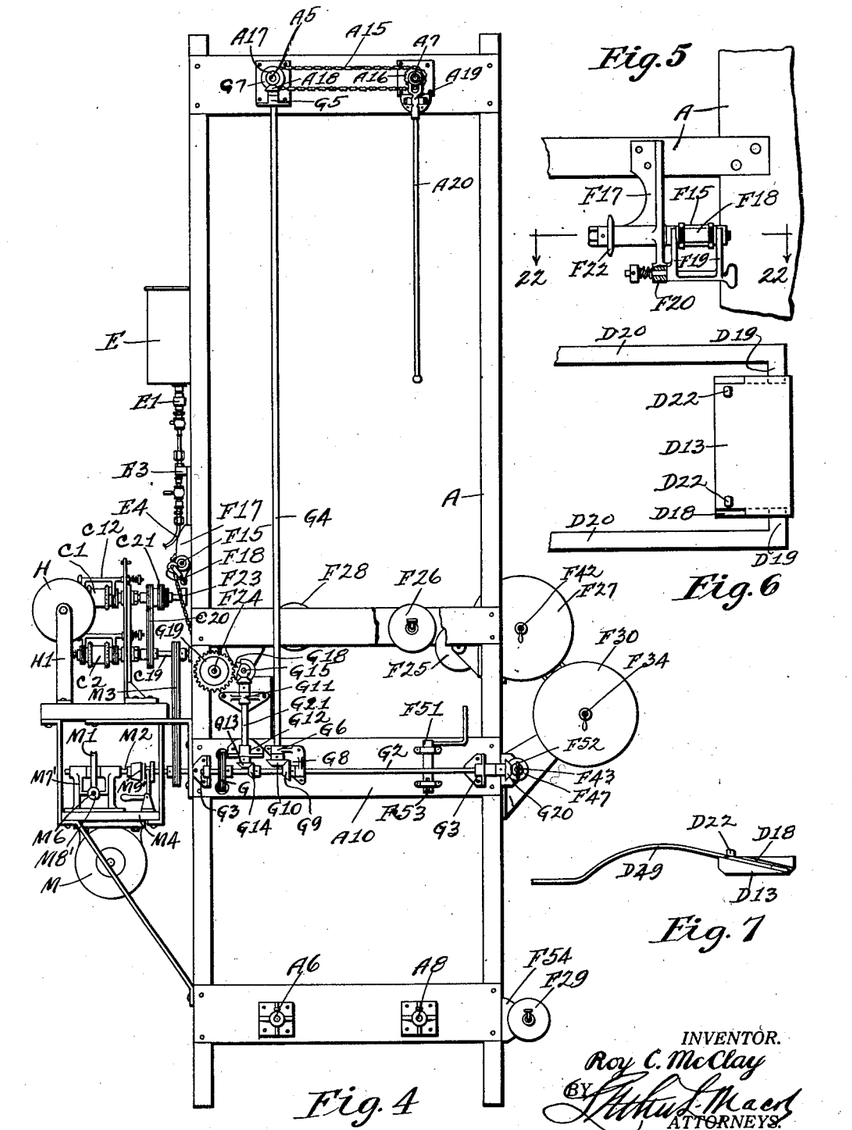
Fig. 4 is a right hand end elevation of the mechanism shown in Fig. 1.
Fig. 5 is an enlarged view of an adjustable film moving device shown in Fig. 1.
Figs. 6 and 7 are details of the film coloring means.

The bracket C' has a sprocket C17 associated therewith which is fixed to the shaft C6 and is adapted to operably connect with a similar sprocket C18 on shaft C19 of roller C2, by means of a sprocket chain C20 as shown in Fig. 4. Thus the shafts C6 and C19 will operate synchronously in the same direction for moving the films F and F' away from the coloring mechanism.

Shaft C6 also has a sprocket C21 frictionally connected therewith which connects with the shaft D23 by means of a chain C22, and to this end engages a sprocket C23 on the shaft D23. Shaft C6 has a friction disc C24 fixed thereto which is frictionally connected with the sprocket C21 by means of a fibre or frictional disc of suitable material C25.

A similar friction disc C26 may be interposed between and frictionally engage the sprockets C17 and C21. Shaft C19 is operably connected with a motor M through the instrumentality of means shown in Fig. 1, which includes a worm gear M1 having a shaft M2 operably connected with a sprocket C27 on shaft C19 by means of a chain M3.

The motor is mounted on a suitable base M4 attached to the frame A, and is connected by means of a belt or chain M5 with a worm shaft M6. Said belt operates over a driving pulley M7 fixed to the motor shaft M8 and a driven pulley M9 fixed to the worm shaft M6. Shafts M2 and M6 are suitably journaled in a frame M7' attached to the base M4, and the shaft M6 carries a worm M8' in mesh with the worm gear M1.

The shaft M2 may be sectional and comprise a clutch device M9' by means of which the driving chain M3 may be operatively connected with and disconnected from the worm gear shaft M2 at will. Thus, power is applied to the color transfer means and the film feeding means hereinabove described, from the motor M.

It is desirable that the film actuating rollers C1 and C2, as shown in Fig. 21, should be self-adjusting, and to this end they are frictionally driven by means of discs C28, C28 fixed to the enlarged portions C29 of said shafts. Friction discs C30, C30 are interposed between the discs C28, C28 and the ends of the sprockets C1 and C2.

The outer disc C28, the disc C30 and the rollers C1 and C2 are longitudinally slidable on their shafts and are self-adjusting by reason of compression springs C31, C31 on the outer ends C32 of their shafts which compress between the discs C28 and a collar C33 associated with each of said rollers.

Sprockets C1 and C2 are of the usual form and structure of devices employed in motion picture machines and are provided with the usual teeth for engagement with the film perforations. When the films F and F' disengage the sprockets C1 and C2, respectively, as shown in Fig. 24, they are looped at F13 and F14 prior to their engagement with forwarding sprockets F15 and F16, respectively. Said last mentioned sprockets are mounted similarly to the sprockets C1 and C2 but at right angles thereto, as shown in Figs. 1 and 5.

Sprocket F15 is carried on a bracket F17 attached to a suitable member of the frame A, as shown in Fig. 5, and has associated therewith a follower roller F18 which is pivotally mounted on a spring held arm F19 adjustably supported on a lug F20 of the bracket F17.

The shaft F21 of sprocket F15 carries a driving sprocket F22 adjacent the bracket F17, over which a chain F23 operates for driving the sprocket F15 from a horizontal shaft F24 mounted on the frame A, as shown in Fig. 4. The film actuating sprocket F16 is mounted on shaft F24 and said shaft is driven as hereinafter described for moving the film F'.

Power is applied from shaft M2 by means of a sprocket chain G which operates over a sprocket G1 on a shaft G2 externally of frame A and supported thereon in suitable brackets G3, G3. Shaft G2 extends transversely across the right hand end of the frame A, and the brackets G3 are mounted on a portion A10 of said frame.

Motion is communicated to shafts A5 and A7 at the top of the frame A through the medium of an elongated vertical shaft G4 which is journaled in bearings G5 and G6 of brackets G7 and G8 attached to the frame A near the end of the shaft G4. Shafts G2 and G4 are connected by means of bevel gears G9 and G10 respectively.

A short vertical shaft G21 is mounted in bearings G11 and G12 on the frame A and is connected for operation with the shaft G2 by means of bevel gears G13 and G14, respectively, fixed to shafts G21 and G2. In a similar manner a gear reduction shaft G15 is operably connected with a shaft G21 by means of bevel gears G16 and G17 on said shafts, respectively. Shafts G15 and F24 are connected for operation by means of spur gears G18 and G19, respectively, fixed to said shafts.

The ratio of gears G18 and G19 is such that the shafts F24 will operate at a substantially lesser speed than the shaft G15. This ratio is approximately four to one, so that the loops F13 and F14 are at all times maintained for the purpose of providing sufficient slack in the films F and F' to prevent the tightening of the films as they are moved on their actuating sprockets.

In this connection it will be understood that the shaft F24 operates continuously, while the films F and F' are advanced only intermittently due to the reciprocation of the cross head D35 which serves to advance the film frame by frame through the film coloring unit D. For this reason it is necessary to maintain substantial loops in the films between the point of egress from the unit D and their points of engagement with the sprockets F15 and F16.

The shafts A5 and A7 at the top of the frame A which carry the rollers A1 and A3 are operably connected by means of a sprocket chain A15 which operates over sprockets as at A16 on each of the shafts A5 and A7. Shaft A5 is driven from the shaft G4 by means of bevel gears A17 and A18 on the shafts A5 and B4, respectively.

A suitable clutch device A19 having an operating handle A20 may be employed in connection with the shaft A7 for the purpose of connecting and disconnecting said shaft from the shaft A5 at will.

Now, referring to Fig. 23 it will be noted that the film F is moved from sprocket F15 over a roller F25, thence upwardly over alternate rollers A3 and A4 throughout the entire series of such rollers, and finally over a roller F26 and onto a take-off reel F27. Film F', however, is moved from sprocket F16 over a roller F28, and thence upwardly and downwardly over rollers A1 and A2 alternately throughout the entire series of such rollers, and finally from the last of the rollers A2 over a roller F29, and thence onto a take-off reel F30.

Figures 8, 9, 10, 11, 12:
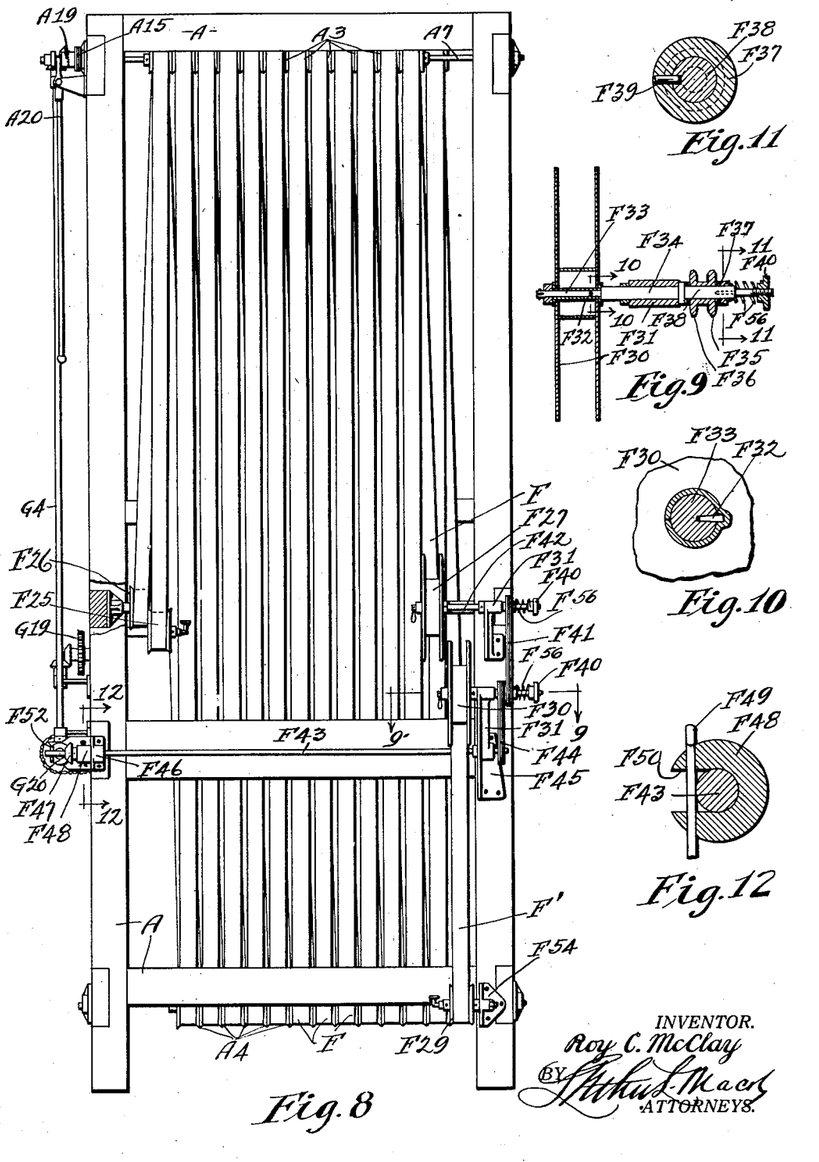
Fig. 8 is a rear elevation of the machine.
Fig. 9 is a sectional plan of the same on line 9—9.
Figs. 10 and 11 are transverse sections on lines 10—10 and 11—11 respectively, of Fig. 9.
Fig. 12 is a transverse section of Fig. 8 on line 12—12.
Figure 13:
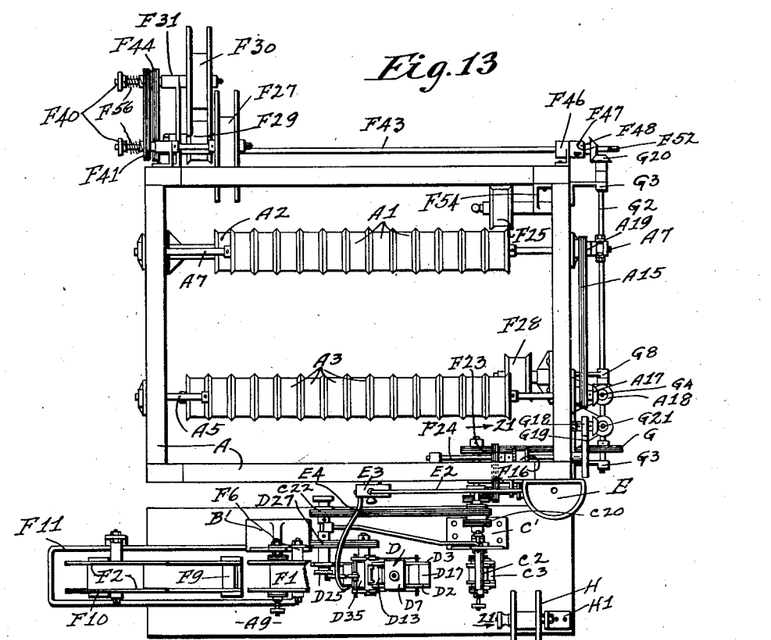
Fig. 13 is a top plan view of the mechanism shown in Fig. 1.

Reel F30 is rotatably mounted on the bracket F31 attached to the rear of the frame in the manner shown in Fig. 9. The hub of said reel is fixed by means of a pin F32 with a portion F33 of the shaft F34 which is journaled in bracket F31. The outer end of shaft F34, carries two sprockets F35 and F36 which are frictionally mounted on the shaft by means of a spring held collar F37 shown in Fig. 11. which is keyed to a portion F38 of the shaft by means of a pin F39.

Friction discs such as are shown in association with the rollers C1 and C2 are provided for frictionally connecting the sprockets F35 and F36 with the shaft F34. The frictional engagement of said elements is maintained by means of a compression spring F56 and a collar F40 on the extension of shaft F34. This structure is also typical of the take-off reel F27.

Sprocket F36 is connected with a similar sprocket on a horizontal shaft F43 geared to the frame A by means of a chain F44. Shaft F43 is journaled in brackets F45 and F46 attached to the frame A and is adapted to be operably connected with the shaft G2 by means of bevel gears F47 and G20 fixed to said shafts, respectively.

Thus, by means of the mechanism described all of the film carrying reels, rollers and sprockets are interconnected for simultaneous operation for feeding the films F and F' throughout a complete cycle of operation. In this respect it is to be noted that the exposure of the film in the frame A when suspended on the rollers A1, A2 and A3 and A4 will effect the drying of the films before they are wound on the reels F27 and F30.

It is frequently desirable, however, to disconnect the shaft F43 from the shaft G2, and for this purpose I provide a collar F48 on the left hand end of the shaft F43, as shown in Fig. 8, which may be laterally removed from the shaft when a retaining pin F49 is removed therefrom. Said collar has a slot F50 therein which is closed by the pin F49 for retaining the collar on the shaft between the gear F47 and bracket F46 when said shaft is power operated. The removal of collar F48 will permit the sliding of the shaft F43 to the right, as shown in Fig. 8, so as to unmesh the gears F47 and G20. A suitable crank F51 shown in Fig. 4 may be employed for connection with the end of shaft F43 for rotating said shaft on the reels F27 and F30 when said gears are disconnected.

A pin F52 at the end of shaft F43 engages a slot F53 in the end of the crank whereby the crank may be operably connected for rotating the shaft.

Rollers F25, F26 and F29 are suitably mounted by means of brackets or suitable devices as shown or otherwise, in the frame A as at F54, and the same is true of rollers F28.

A pilot reel may be carried on a reel H frictionally held on a bracket H1 attached to the base A9 of the frame, from which the pilot film may be threaded over the rollers A1, A2, A3 and A4 and on the reels F27 and F30 at the beginning of a film coloring operation. The films F and F' are then unwound from the reels F1 and F2, respectively and threaded through sprockets F6 and F7 and thence through the coloring unit D, over sprockets C1 and C2, after which the ends of the films F and F' may be attached to the ends of the pilot films by means of the metal connectors shown in Fig. 3.

Figure 3:
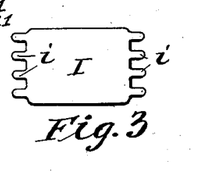
Fig. 3 is a view of a thin metallic connector for attaching portions of a film together.

Said connectors are formed of thin metal plates I with laterally projecting teeth i, i, etc., thereon which are adapted to be bent at right angles upwardly through the perforations F12 of the films, and thence over the opposite sides of the films. Thereafter the films F and F' will be drawn through the coloring unit D and over the drying rollers A1, A2, A3 and A4 and associated parts, and thence wound upon the reels F27 and F30 over the pilot film.

The key of matrix film is colored in desired tints throughout all or portions of the areas of the successive frames prior to a coloring operation.

The films F and F' are positives and have the same subjective matter thereon. Said films are threaded with corresponding frames in registration, and thereafter this registration and alinement of the images on the two films will be maintained throughout the coloring zone within the unit D.

It is necessary that a separate key film F be provided for each of the different colors imparted to the subjective film F', and therefore a subjective film F' must be run through the coloring mechanism once for each color to be imparted thereto. If several different colors are applied to the subjective film, that is to say, different portions thereof colored differently, each key film will carry but one of the colors throughout the portions thereof corresponding to the portions of the subjective film to be colored a given tint.

Superposition of colors may be effected by tinting separate key films F' in the several primary colors, and thereafter running the films F and F', together through the coloring unit for as many times as are necessary to superpose the colors one upon the other and obtain a desired tint.

For instance, the subjective film may be moved in contact with a key film which is colored blue, and thereafter again moved in contact with another key film which is colored red. Super-position of the blue on the red will impart a purple tint to the subjective film.

The moistening of the subject film F both in the receptacle F11 and by means of the drip pipe E4 will cause an adhesion of the films F and F' together, and the expulsion of air from therebetween when the two films are moved in accurate registration through the film coloring mechanism D and between the tension rollers D4 and contact blocks D13.

The gelatine coating on the key film which has previously been saturated with a dye, when moistened in contact with the subjective film will by osmotic action cause the diffusion of the dye from the gelatin on the key film and the absorption thereof by the gelatine on the subjective film. The subjective film will therefore partake of the color of the key film in all instances.

In the consideration of this invention it may be understood that the coloring unit D is so arranged that the films F and F' will move through the coloring unit D in slightly inclined planes, and that the contact blocks D13 will follow each other in procession as shown in Fig. 16.

It should be further understood that the operation of the film actuating mechanism is quite slow as compared to other film actuating mechanisms in motion picture machines. The initial movement of the films is intermittent, while the final movement thereof is continuous and it is necessary that the coloring zone in the unit D should be disposed in a straight rather than in an arcuate path in order to maintain an arcuate register of the two films and to prevent any longitudinal adjustment of one of the films with respect to the other.

An advantage of the mechanism embodied in the coloring unit is that the color is applied to the subjective film in a relatively short period of time and throughout a very short portion of the length of the film. It has been found to be a distinct advantage to the coloring of films in this manner in preference to extending the duration of the coloring operation and increasing the length of the portions of the film which are held in contact with each other. In other words, it is much less difficult to maintain an accurate register throughout a short interval of contact than for a longer interval.

What I claim is:

1. The method of coloring motion picture films which consists in moving a key film carrying a color in selected portions thereof in registration and pressure contact with a moist subjective film with corresponding subject matter in close contact therewith between relatively rotatable and slidable elements for a distance corresponding to a plurality of frames of said film, for transferring the color from the key film to corresponding portions of the subjective film.

2. The method of coloring motion picture films which consists in moving the colored key film and the moistened subjective film in registration and in close contact with each other, between relatively rotatable tensioning means and slidable forwarding means for a given distance for effecting a transfer of the color from the key film to corresponding portions of the subjective film.

3. The method of coloring motion picture films which consists in supporting a colored key film and a moistened subjective film in close contact on a series of slidable contact elements, simultaneously and intermittently moving said films and said contact elements for effecting a transfer of the color from the key film to corresponding portions of the subjective film, and thereafter separately moving said films to and for disposition on a drier.

ROY C. McCLAY.